United States Patent
Bechade

[19]

[11] Patent Number: 5,975,749
[45] Date of Patent: Nov. 2, 1999

[54] ZERO AND ONE DETECTION CHAIN FOR A CARRY SELECT ADDER

[75] Inventor: Roland A. Bechade, Somerville, N.J.

[73] Assignee: International Business Machines Corporation, Armonk, N.Y.

[21] Appl. No.: 08/893,804

[22] Filed: Jul. 11, 1997

[51] Int. Cl.[6] .................................................. G06F 7/50
[52] U.S. Cl. ...................... 364/736.5; 364/788
[58] Field of Search .................................. 364/736.5, 788

[56] References Cited

U.S. PATENT DOCUMENTS

| | | | |
|---|---|---|---|
| 3,895,222 | 7/1975 | Maringer et al. | 701/102 |
| 4,982,352 | 1/1991 | Taylor et al. | 364/715.01 |
| 5,204,832 | 4/1993 | Nakakura | 364/788 |
| 5,229,959 | 7/1993 | Scriber | 364/788 |
| 5,272,662 | 12/1993 | Scriber et al. | 364/788 |
| 5,285,406 | 2/1994 | Lynch et al. | 364/788 |
| 5,367,477 | 11/1994 | Hinds et al. | 364/736.5 |
| 5,508,950 | 4/1996 | Bosshart et al. | 364/736.5 |
| 5,581,496 | 12/1996 | Lai et al. | 364/736.5 |
| 5,586,069 | 12/1996 | Dockser | 364/736.5 |
| 5,644,521 | 7/1997 | Simpson | 364/736.5 |
| 5,764,550 | 6/1998 | D'Souza | 364/788 |

OTHER PUBLICATIONS

"Improved Zero Result Detection When Using A Carry Look–Ahead Adders", IBM Technical Disclosure Bulletin, vol. 30 No. 11 Apr. 1988, pp. 288–290.

*Primary Examiner*—David H. Malzahn
*Attorney, Agent, or Firm*—Whitman, Curtis & Whitham; Eugene I. Shkurko, Esq.

[57] ABSTRACT

A carry select adder includes an adder for outputting a first sum of values based on a first presumed carry-in of zero and a second sum of the values based on a second presumed carry-in of one. A sum unit produces an actual sum comprising either the first sum or the second sum based on an actual carry-in and simultaneously determines whether the actual sum is all zeros or all ones. The sum unit selects the actual sum and determines whether the actual sum comprises all zeros or ones in the same time period such that there is no significant additional delay associated with the zero/one detection operation.

19 Claims, 12 Drawing Sheets

ZERO AND ONE DETECTION CHAIN FOR A CARRY SELECT ADDER

BACKGROUND OF THE INVENTION

1. Field of the Invention

The present invention generally relates to arithmetic units for digital computers and, more particularly, to a carry select adder that includes zero and one detection circuitry.

2. Background Description

In a microprocessor, it is often necessary to check for overflow or underflow on the result of some operation. A separate zero and one detection function unit is conventionally performed on the output of an adder.

A zero detection unit operates in the binary system to check an output to determine if the output is all zeros (i.e., 0000). The one detection unit similarly checks if the output is all ones (i.e., 1111).

The zero detect function is necessary in units that compare two inputs to determine if they are equal and in floating point operations to determine underflow or overflow.

The conventional method of zero/one detection is to perform the addition in one unit and then check if the output bits are all ones or all zeros in a separate unit. This check is conventionally done in series with the addition operation. In some existing processor designs, the zero and one detection is done in a tree fashion, checking for all zeros or all ones in 4-bit slices. The 4-bit results are then combined into intermediate signals for 8, 16, 32 or 64-bit results. The timing of the zero and one detection is critical to the operational speed of the processor.

SUMMARY OF THE INVENTION

It is, therefore, an object of the present invention to provide sum unit that includes a zero and one detection circuit that generates the one and zero output with one additional delay.

According to the invention, there is provided a sum unit that includes a zero and one detection circuit for a carry select adder in which the additional delay required to perform the zero and one detection is relatively small with respect to the remainder of the addition operation. In the inventive structure, the zero and one detection functions are essentially done in parallel with the addition operation and are performed in the addition unit.

More specifically, the invention includes means for adding which outputs a first sum comprising an addition of values based on a presumed carry-in of zero and outputs a second sum comprising an addition of the values based on a second presumed carry-in of one, means for summing which selecting an actual sum comprising the first sum or the second sum based on an actual carry-in. The summing means determines whether the actual sum comprises all zeros or all ones.

The summing means simultaneously selects the actual sum and determines whether the actual sum comprises all zeros or all ones. Further, the summing means selects the actual sum and determines whether the actual sum comprises all zeros or all ones in the same time period.

Multiple summing means each output zero/one detection signals based on zero/one detections of the first and second sums and a zero/one detector selects between the zero/one detection signals based on the actual carry-in signal.

In a specific embodiment, the carry select adder comprises a 32-bit carry select adder, made up of a 20-bit adder and a first 12-bit adder, the 20-bit adder comprising an 8-bit adder and a second 12-bit adder. A selecting means determines if the 20-bit zero/one detection signals and the first 12-bit zero/one detection signals each indicate all zeros or all ones.

Another selecting means determines if the 8-bit zero/one detection signal and the second 12-bit zero/one detection signal each indicate all zeros or all ones.

For a specific implementation of the adder, the additional delay for the zero and one detection is only 0.2 nanoseconds for the most critical path. For many input conditions, the check signals are available before the sum bits and do not require any additional delay.

BRIEF DESCRIPTION OF THE DRAWINGS

The foregoing and other objects, aspects and advantages will be better understood from the following detailed description of a preferred embodiment of the invention with reference to the drawings, in which:

FIGS. 7, 7A, and 7B, taken together, show a block and logic diagram showing the circuit of the one and zero detection selectors illustrated in FIGS. 1A, 1B and 2 according to the invention.

DETAILED DESCRIPTION OF A PREFERRED EMBODIMENT OF THE INVENTION

A carry select adder performs two parallel addition operations, each based on a different presumed carry-in value. A selector chooses between the results of the alternative addition operations based on an actual carry-in value. To increase the speed of the carry select adder, the values to be added are typically divided into 2-bit, 4-bit, 8-bit or other n-bit portions. The n-bit portions are then added in parallel and the carry value is propagated from lower order selectors to higher order selectors to allow the selectors to choose between the previously calculated results of the alternative addition operations.

The carry select adder saves processing time by performing the addition operation of different bit positions in parallel. A properly designed carry select adder has the lower order bits divided into smaller bit portions and the higher order bits divided into relatively larger bit portions. Therefore, the delay associated with the lower order adders when combined with the delay associated with the lower order selectors should equal the delay associated with the upper order adder. In such a structure, a carry-in signal should reach a given selector at approximately the same time as the sums from the associated addition units reach the given selector.

Figure 1A:
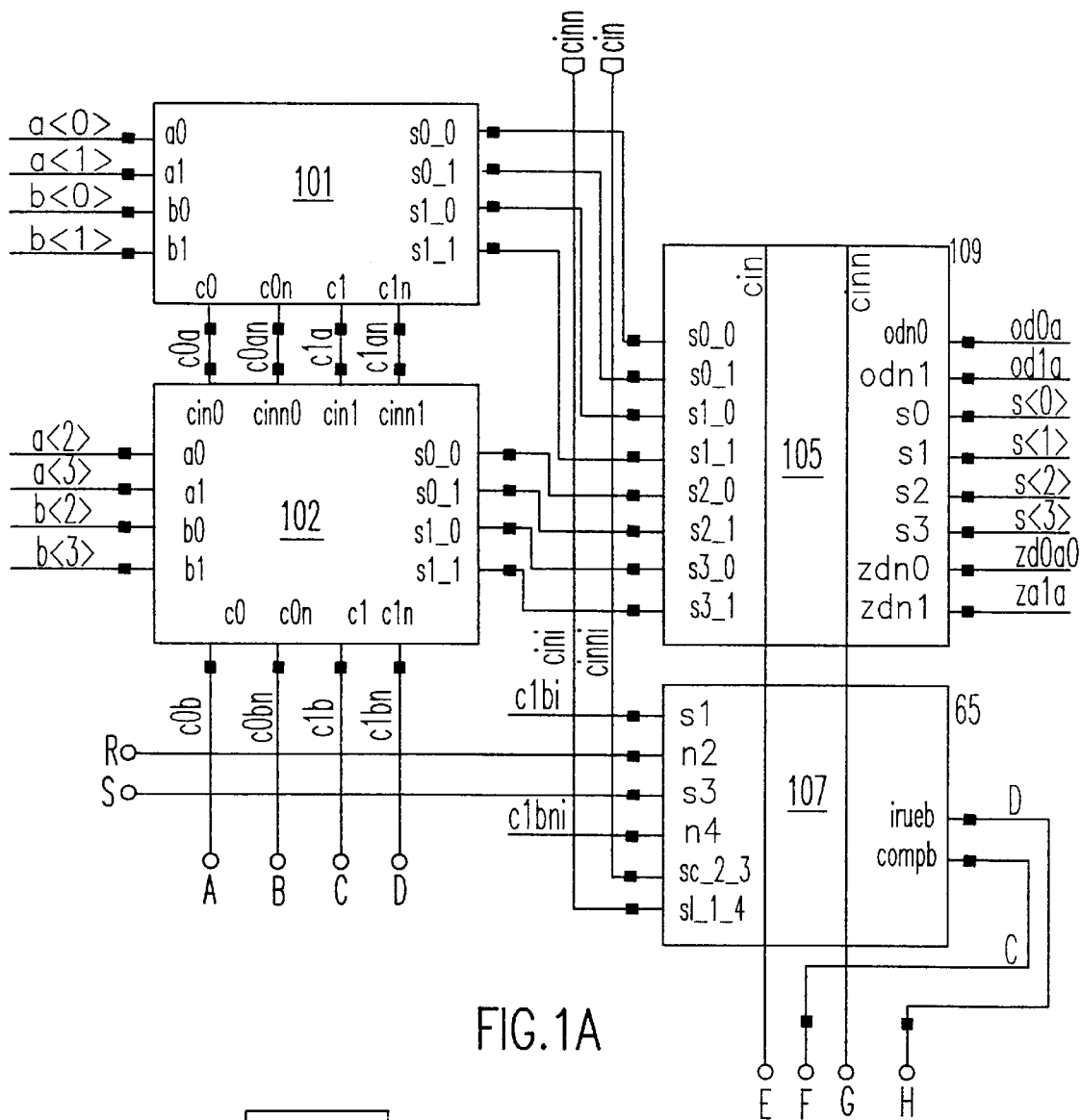
FIGS. 1, 1A, 1B, 1C, 1D, 2, 2A, and 2B, taken together, are block and logic diagrams showing the circuits of a lower 20-bit carry select adder unit having zero and one detection functions according to the invention.
Figure 1:
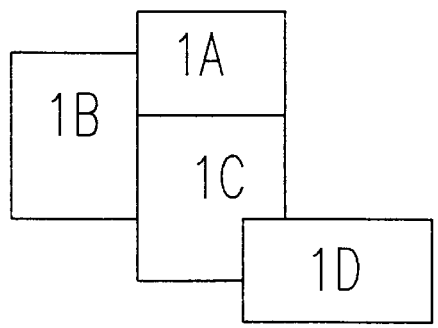
Figure 2A:
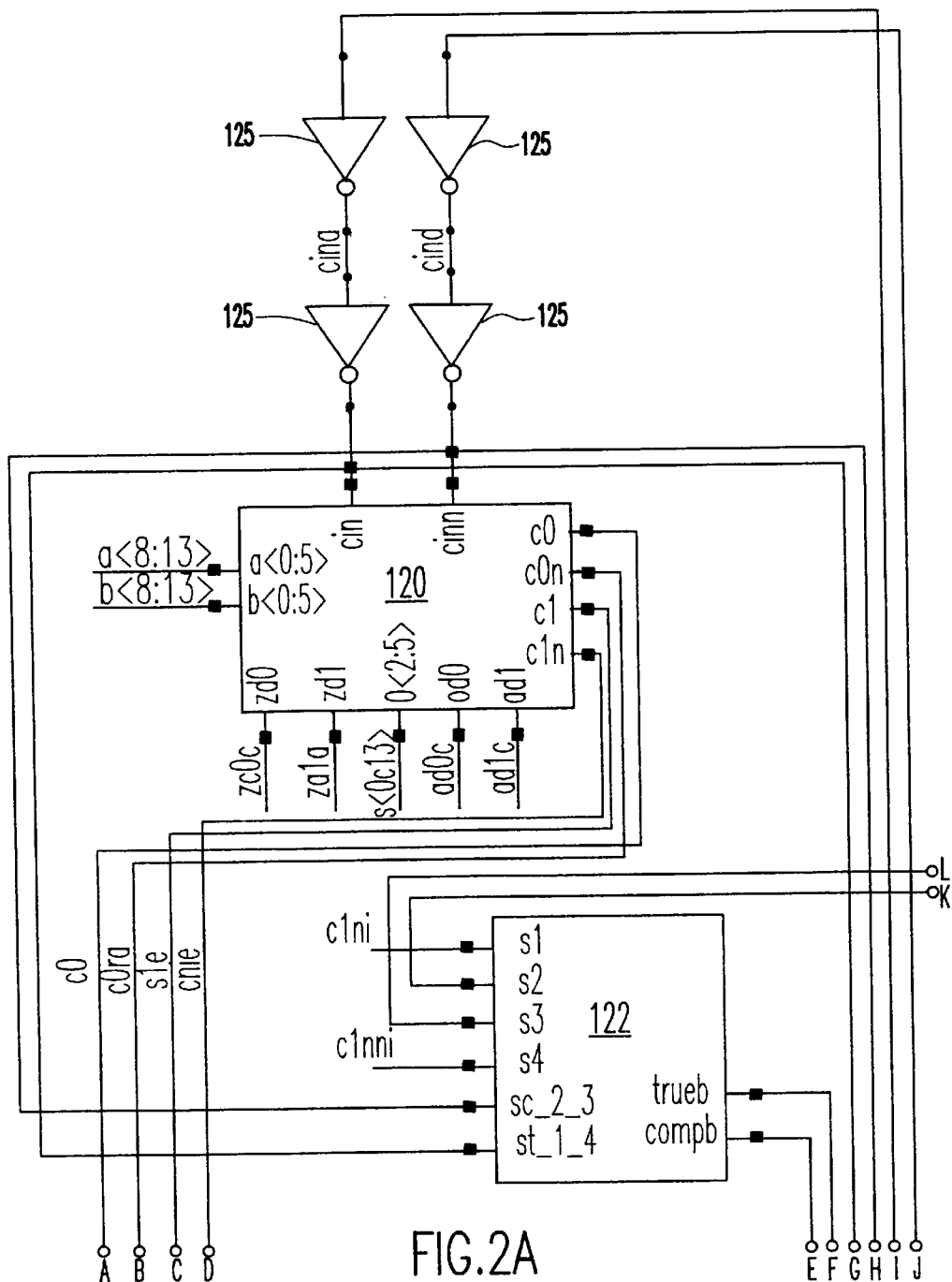
Figure 2:
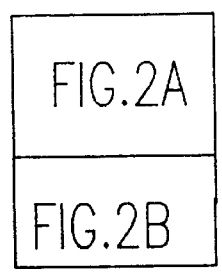
Figure 3:
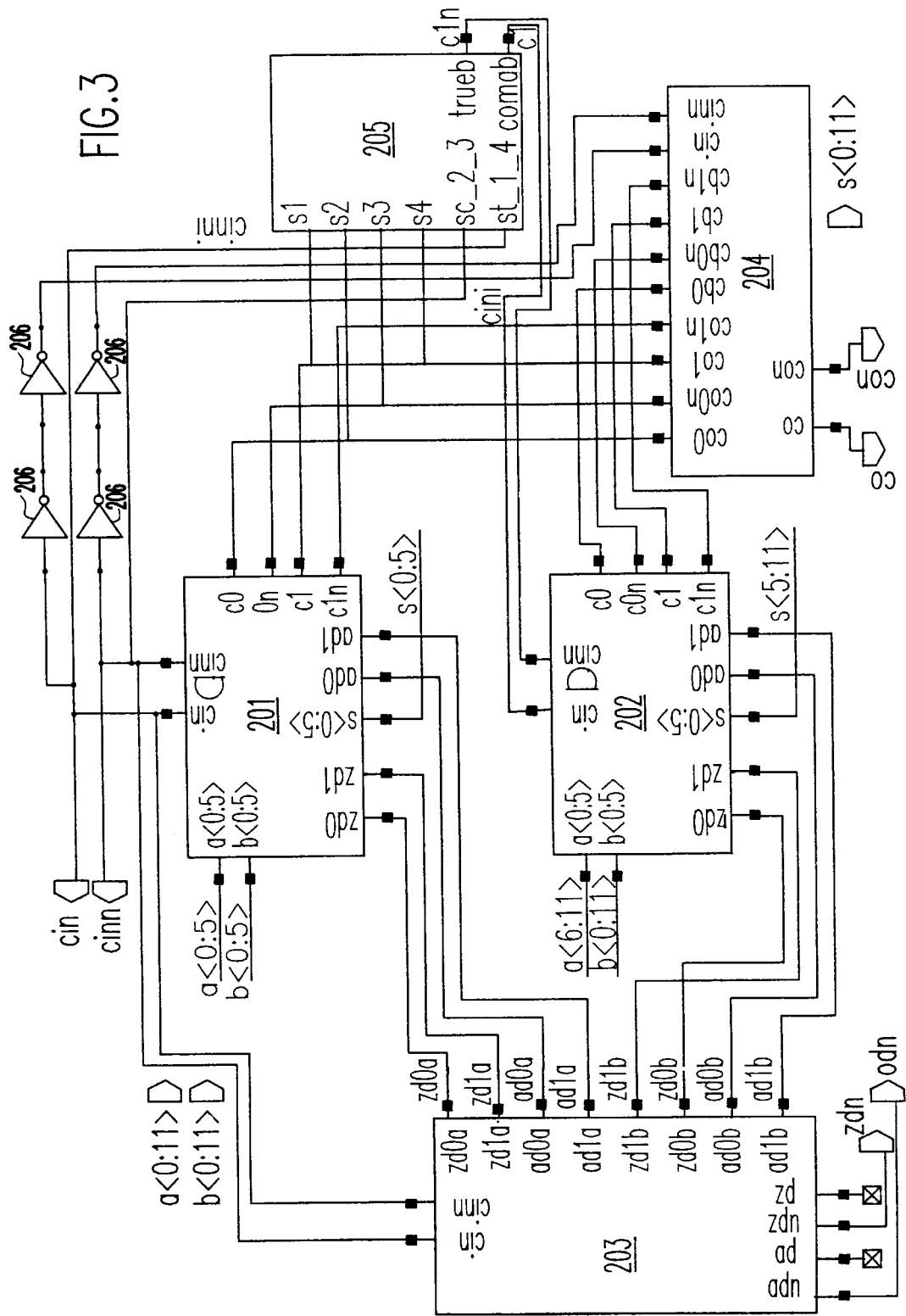
FIG. 3 is a block and logic diagram showing the circuits of an upper 12-bit carry select adder unit having zero and one detection functions according to the invention.
Figure 4:
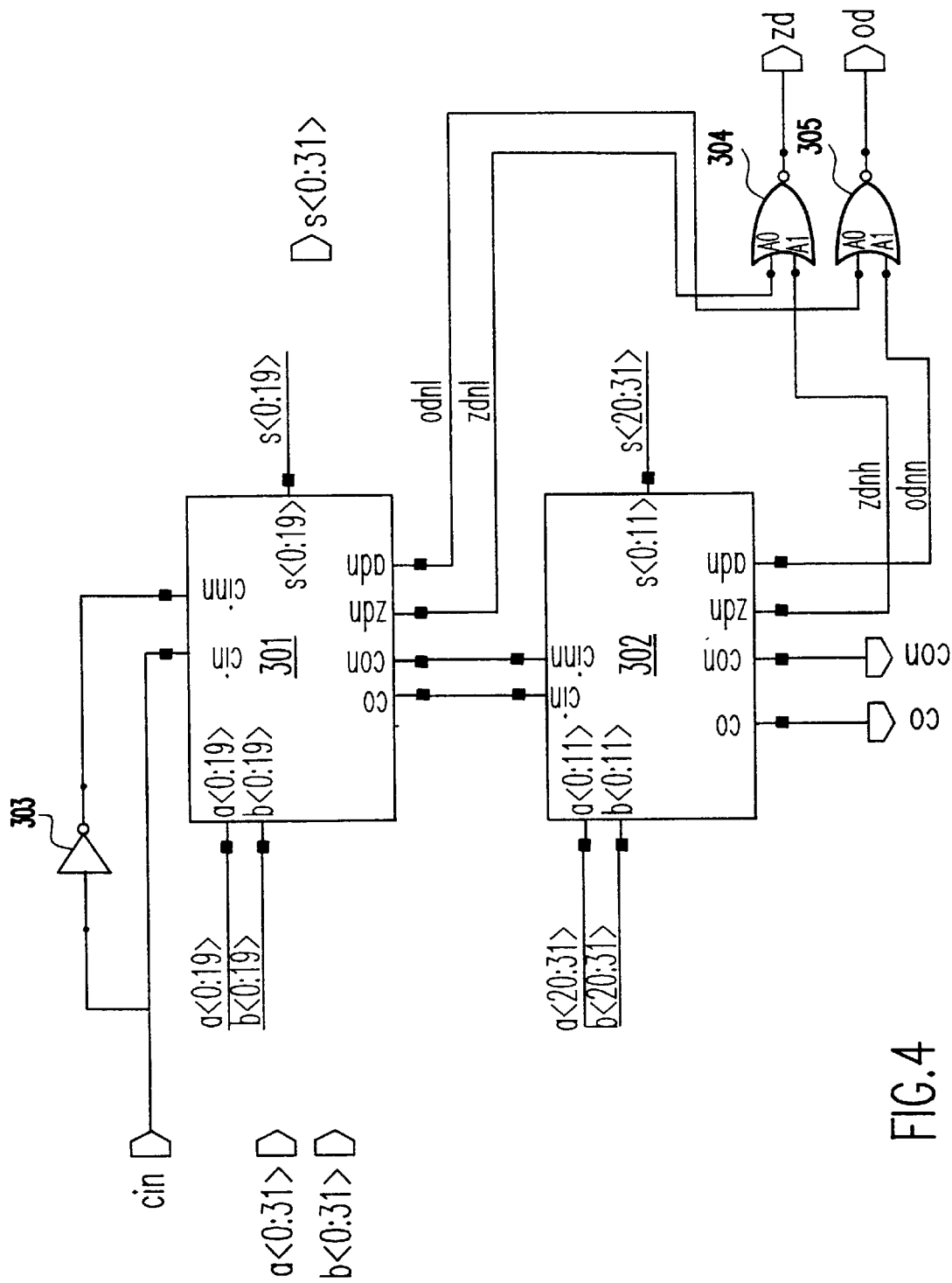
FIG. 4 is a block and logic diagram showing the lower 20-bit unit of FIGS. 1A and 1B and the upper 12-bit unit of FIG. 2 combined to form a 32-bit adder incorporating zero and one detection functions according to the invention.

FIGS. 1 and 2 illustrate a carry select adder for the lower 20-bits (i.e., 0:19) of values (i.e., "a" and "b") to be added. FIG. 3 illustrates a carry select adder for the upper 12-bits (i.e., 0:11) of values to be added. FIG. 4 illustrates the lower 20-bit unit of FIGS. 1 and 2 and the upper 12-bit unit of FIG. 3 combined to form a 32-bit adder. While, in FIGS. 1 and 2, a 32-bit adder is illustrated, one ordinarily skilled in the art would be able to construct any n-bit adder having a zero/one detection function given the following disclosure.

Figure 1B:
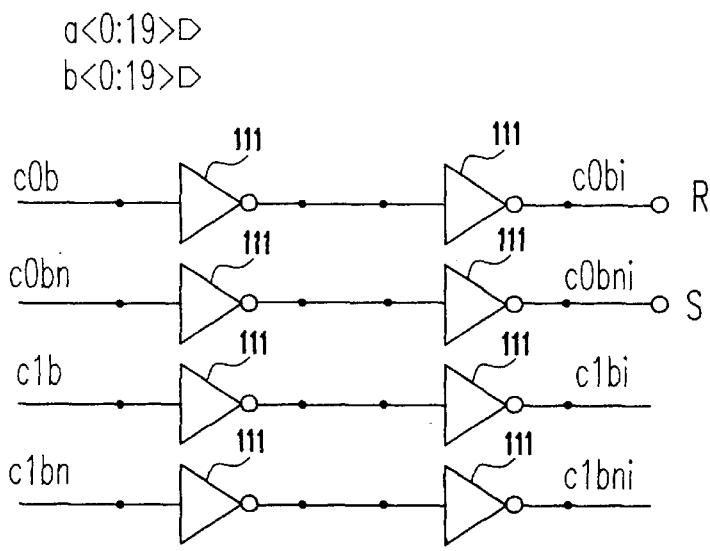
Figure 1C:
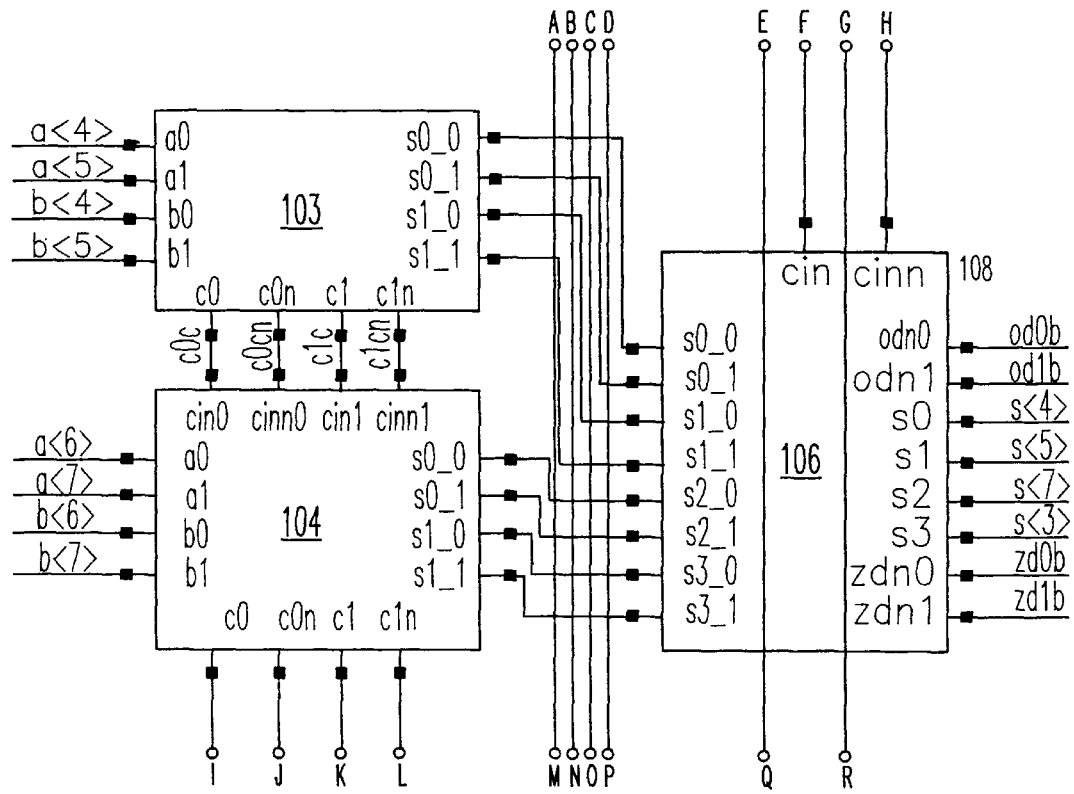
Figure 1D:
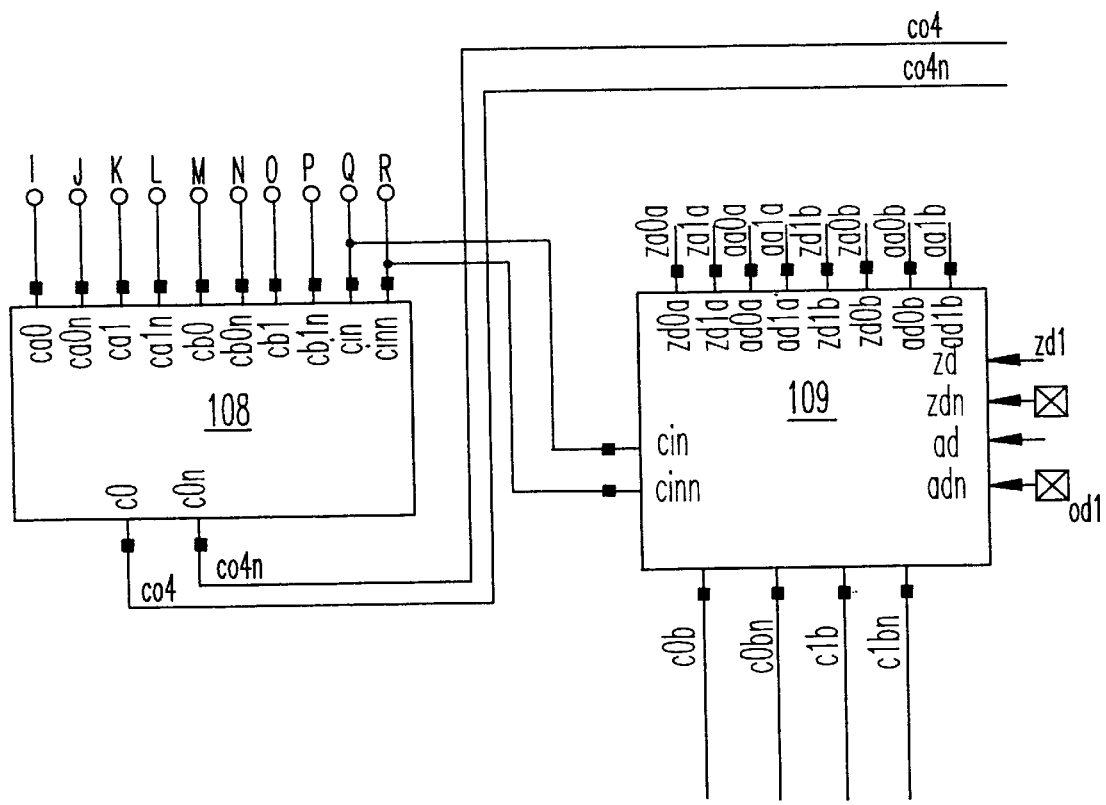
Figure 2B:
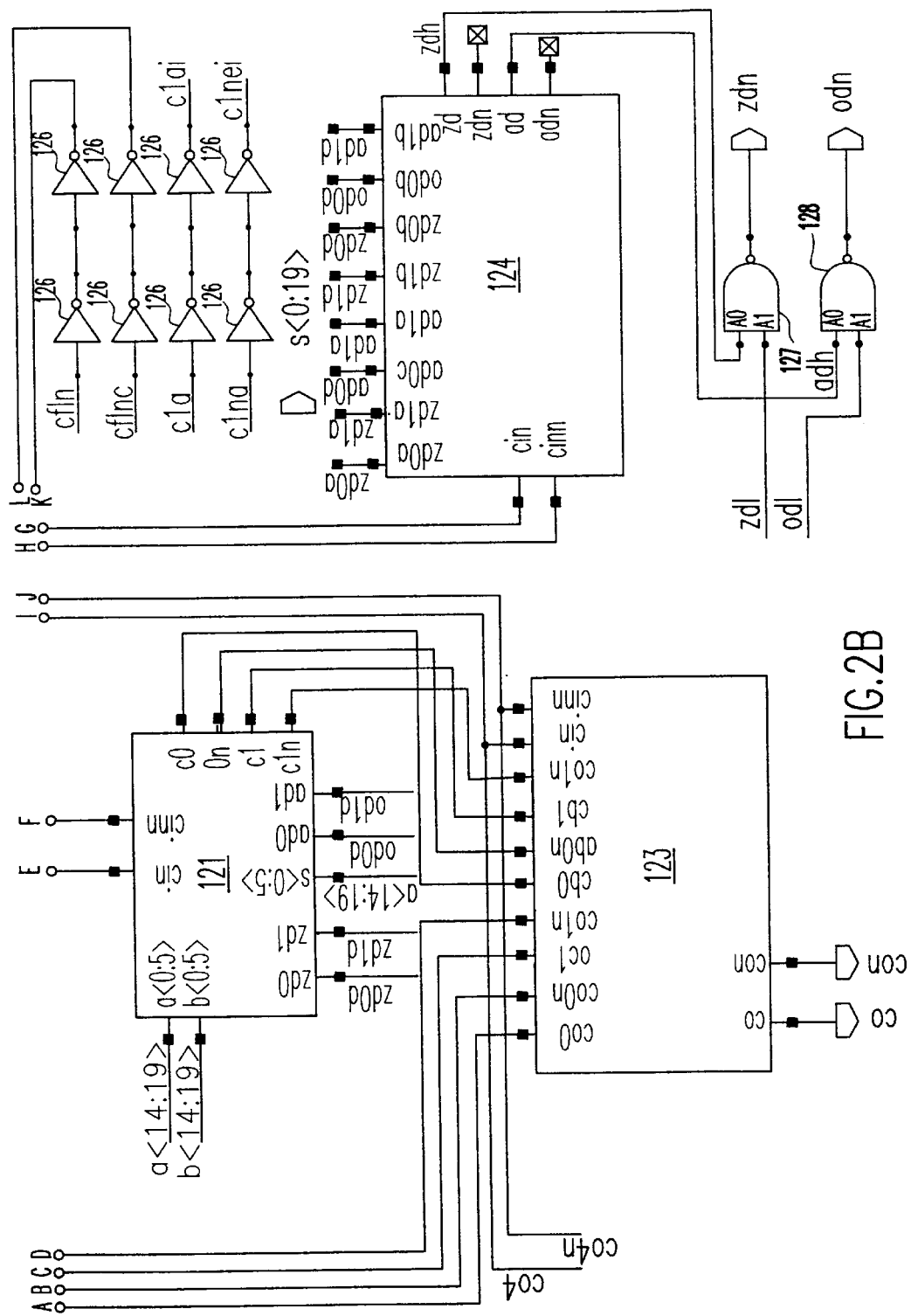

FIGS. 1A–D illustrate an 8-bit carry select adder and FIGS. 2A–B illustrate a 12-bit carry select adder which, in combination, act as a 20-bit adder. FIGS. 1A–D includes 2-bit adders 101–104, sum units 105–106, a carry propagation unit 107, a carry-out selector 108, a zero/one detection selector 109 and multiple inverters 111.

In operation, the 8-bit adder in FIGS. 1A–D adds the lower order 8-bits (i.e., 0:7) of two values "a" and "b." Specifically, 2-bit adder 101 receives the first two bits (i.e., 0:1) of the "a" value (i.e., a<0>and a<1>) and the first two bits of the "b" value (i.e., b<0>and b<1>) and adds these bits assuming two different carry-in values (i.e. "1" and "0"). The 2-bit adder 101 outputs the sum of the first bit based on a carry-in of "0" (i.e., s0__0), the sum of the first bit based on a carry-in of "1" (i.e., s0__1) and the sum of the second bit based on a carry-in of "0" (i.e., s__0), the sum of the second bit based on a carry-in of "1" (i.e., s1__1). In such a sense, the adder 101 comprises a means for adding.

The 2-bit adder 101 also outputs the carry-out signal of the first bit based on a carry-in of "0" (i.e., c0) and its complement (i.e., c0n) and the carry-out signal of the second bit based on a carry-in of "1" (i.e., c1) and its complement (i.e., c1n) In such a sense, the adder 101 includes means for outputting sums.

The detailed structure of such a 2-bit adder is within the knowledge of one ordinarily skilled in the art and will not be discussed herein for sake of brevity.

The 2-bit adder 102 similarly adds the next most significant two bits (i.e., 2:3) and incorporates the carry-out from the 2-bit adder 101. The 2-bit adder 103 performs an identical function as 2-bit adder 101 upon bits 4 and 5 of values "a" and "b" and 2-bit adder 104 performs the same function of 2-bit adder 102 upon bits 6 and 7 of values "a" and "b".

Sum unit 105 receives the sum values from adders 101 and 102 that have been based upon a presumed carry-in of "0" and "1" and selects between them based on an actual carry-in "cin" (and the complement of the actual carry-in "cinn") and outputs actual sum values for the four lowest order bits (i.e., s<0>, s<0>, s<2>and s<3>). In such a sense, sum unit 105 comprises means for summing.

Sum unit 105 also produces a one detect signal based upon a presumed carry-in of "0" (i.e., od0n) and a one detect signal based upon a carry-in of "1" (i.e., od1n). This signal will indicate whether the sums s<0>, s<1>, s<2>and s<3>are all "1".

Sum unit 105 also produces a zero detect signal based upon a presumed carry-in of "0" (i.e., zd0n) and a zero detect signal based upon a carry-in of "1" (i.e., zd1n). This signal will indicate whether the sums s<0>, s<1>, s<2>and s<3>are all "0".

Therefore, sum unit 105 comprises means for zero/one detection and means for selecting. Sum unit 105 is shown in more detail in FIG. 5, which is discussed below.

Figure 5:
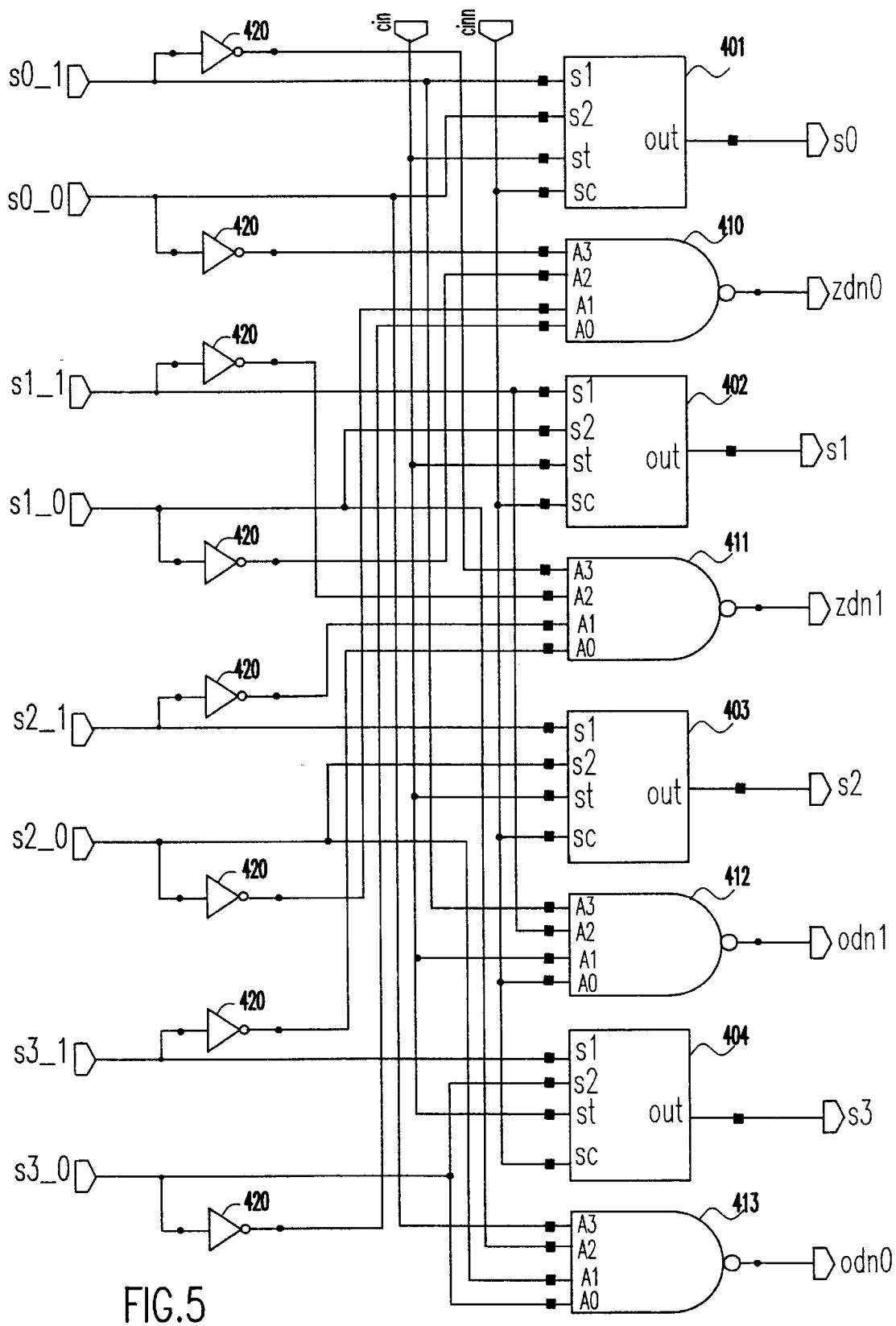
FIG. 5 is a block and logic diagram showing a sum circuit which generates the zero and one detection for a group of four bits in a carry select adder according to the invention.

Sum unit 106 performs an identical function as sum unit 105, except that sum unit 106 operates on the next higher order 4-bit portion (i.e., 4:7) and receives an actual carry-in "cin" (and actual carry-in complement "cinn") from the carry propagate unit 107, the function of which is explained below. The detailed internal operation of sum units 105 and 106 are illustrated in FIG. 5, which is discussed in detail below.

All the drawings illustrate many of the signals which are output from the various units in generic terms and in more relative terms. For example, the sum outputs from adder 102 are shown as the generic terms s0__0, s__1, s1__0 and s__1, while these same signals are illustrated as the more relative s2__0, s2__1, s3__0, s3__1 upon their input to sum unit 105. Similarly, the output from sum unit 105 associated with the one detect given a presumed carry-in of "0" is shown as the generic "odn0" as well as the more relative "od0a." Both the generic and more relative symbols are used to illustrate the similar functions of similar elements.

Carry propagation unit 107 selects a carry-out value from the carry-out values generated by adder 102 based on the actual carry-in signal. The carry propagate unit 107 receives the carry-out signals from adder 102. The carry-out signal based on a presumed carry-in of "0" (i.e., c0b) and its complement (i.e., c0bn) as well as the carry-out signal based on a presumed carry-in of "1" (i.e., c1b) and its complement (i.e., c1bn) are inverted twice by inverters 111. The inverters 111 act as buffers that decouple the load of the carry propagation unit 107 from the carry selector 108. In FIGS. 1A–D, the inverted carry-out signal "c0b" is identified as "c0bi", the inverted carry-out signal "c0nb" is identified as "c0nbi", the inverted carry-out signal "c1b" is identified as "c1bi" and the inverted carry-out signal "c1nb" is identified as "c1nbi." The carry propagation unit 107 also receives the actual carry-in "cin" and the its complement "cinn."

Therefore, the carry propagation unit 107 selects the appropriate carry-out signal and inputs this selected carry-out signal as the actual carry-in signal to the sum unit 106. The detail operation of carry propagation unit 107 is within the knowledge of one ordinarily skilled in the art and is not discussed herein, for sake of brevity.

Carry selector 108 is a two-level selector which receives the carry-out values from adders 102 and 104 and selects between the alternative carry-out values based on the actual carry-in value. More specifically, carry selector 108 receives the carry-out signal based on a presumed carry-in of "0" (i.e., ca0) and its complement (i.e., ca0n) as well as the carry-out signal based on a presumed carry-in of "1" (i.e., ca1) and its complement (i.e., ca1n) from adder 102. Similarly, carry selector 108 receives the carry-out signal based on a presumed carry-in of "0" (i.e., cb0) and its complement (i.e., cb0n) as well as the carry-out signal based on a presumed carry-in of "1" (i.e., cb1) and its complement (i.e., cb1n) from adder 104.

Carry selector 108 selects between these inputs based on the actual carry-in "cin" and its complement "cinn" and outputs an actual carry-out "co" and its complement "con." The internal operation of such a selector is within the knowledge of one ordinarily skilled in the art and will not be discussed in detail for sake of brevity.

Zero/one detection selector 109 receives the one detection signals (i.e., od0a, od1a, od0b and od1b) and the zero detection signals (i.e., zd0a, zd1a, zd0b and zd1b) from sum units 105 and 106 and the carry in signal "cin" and its complement "cinn." The zero/one detection selector 109 selects and outputs the actual zero detection signal "zd" (and its complement "zdn") and the actual one detection signal "od" (and its complement "odn") based on the actual carry-in signal.

Figure 7A:
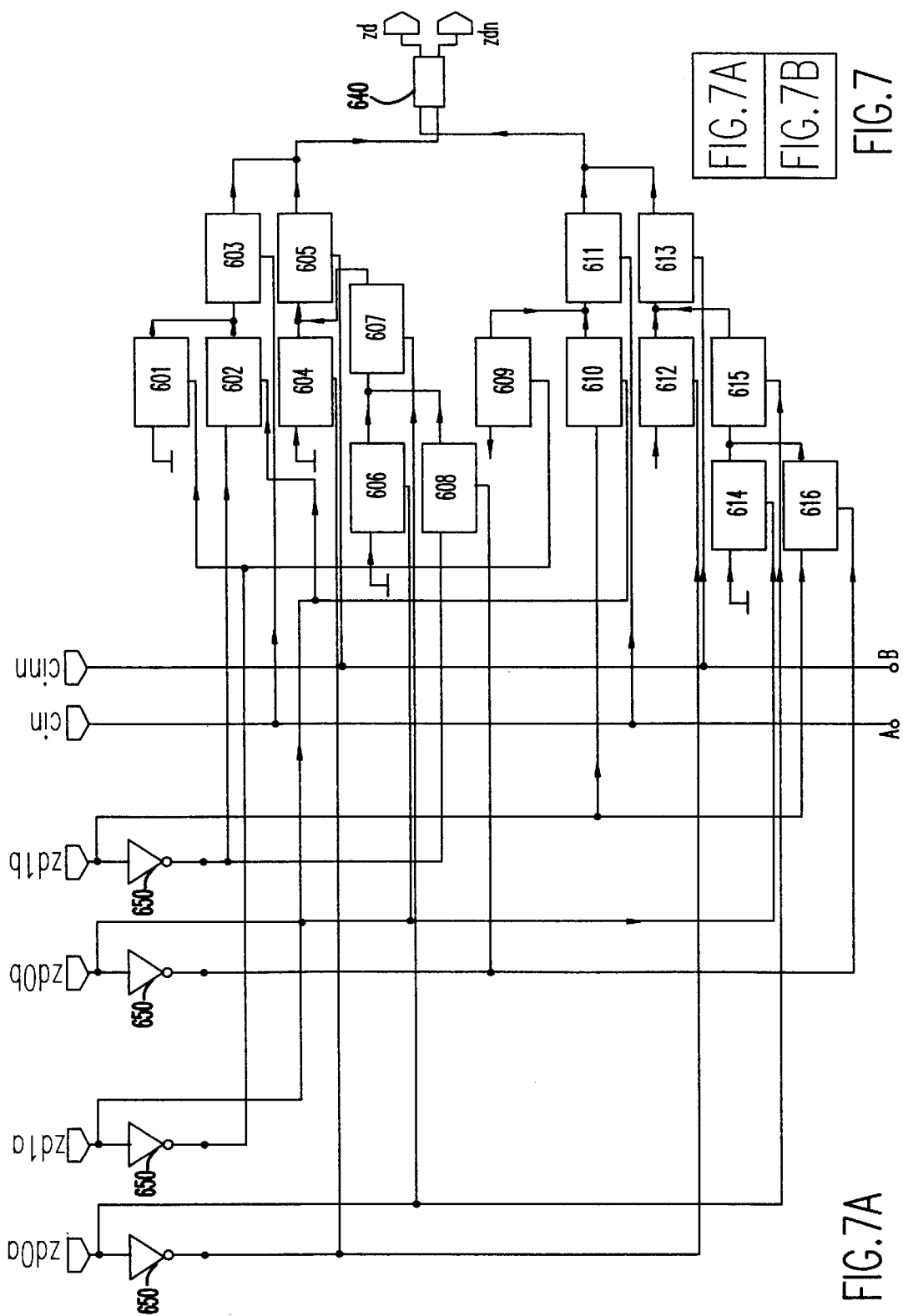
Figure 7B:
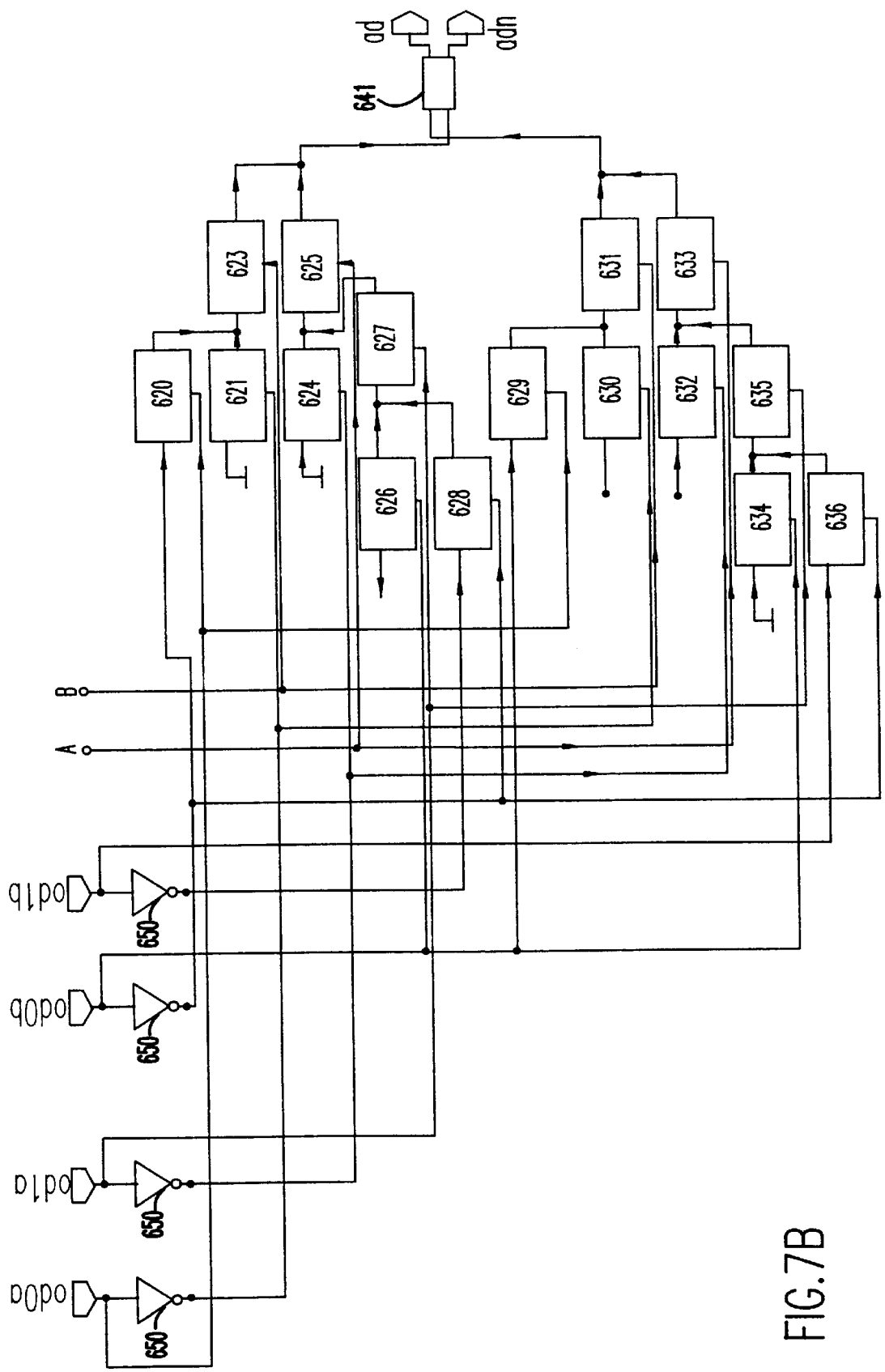

Therefore, element 109 comprises means for producing the "zd", "zdn", "od" and "odn" signals. The detailed operation of the inventive zero/one detection selector 109 is illustrated in FIGS. 7, 7A, and 7B which is discussed below.

Therefore, the portion of the circuit illustrated in FIGS. 1A–D adds the first 8 bits of two values (i.e., "a" and "b") and produces sums s<0>–s<7>, a carry-out "co4" (and its complement "co4n"), a zero detection signal "zd1" (and its complement "zdn") and a one detection signal "od1" (and its complement "odn").

The zero/one detection selector 109 operates in parallel (i.e., simultaneously) with carry selector 108. Therefore, the production of the zero detection signal and one detection signal does not increase the delay when compared with a conventional carry select adder.

FIGS. 2A–B illustrates the portion of the adder which sums the next most significant 12 bits (i.e., 8:19). Specifically, FIGS. 2A–B illustrates 6-bit adders 120–121, a carry propagation unit 122, a carry selector 123, a zero/one detection unit 124, inverters 125–126 and NAND units 127–128.

In operation, the adder 120 receives the carry-out "co4" from carry selector unit 108 (FIG. 1A) and its complement "co4n" (which are processed through inverters 125 in order to decouple the load of the internal sum selector equivalent to the sum selector 105 of FIGS. 1A–D, as discussed above) and adds the first 6 bits of value "a" (i.e., a<8:13>) to the same 6 bits of value "b" (i.e., b<8:13>) to produce a sum s<8:13>, a carry-out "c0" based on a presumed carry-in of "0" (and its complement "c0n"), a carry-out "c1" based on a presumed carry-in of "1" (and its complement "c1n"), a zero detection signal "zd0e" based on a presumed carry-in of "0", a zero detection signal "zd1e" based on a presumed carry in of "1", a one detection signal "od0e" based on a presumed carry-in of "0", and a one detection signal "od1e" based on a presumed carry-in of "1.

Figures 6, 6A, 6B:
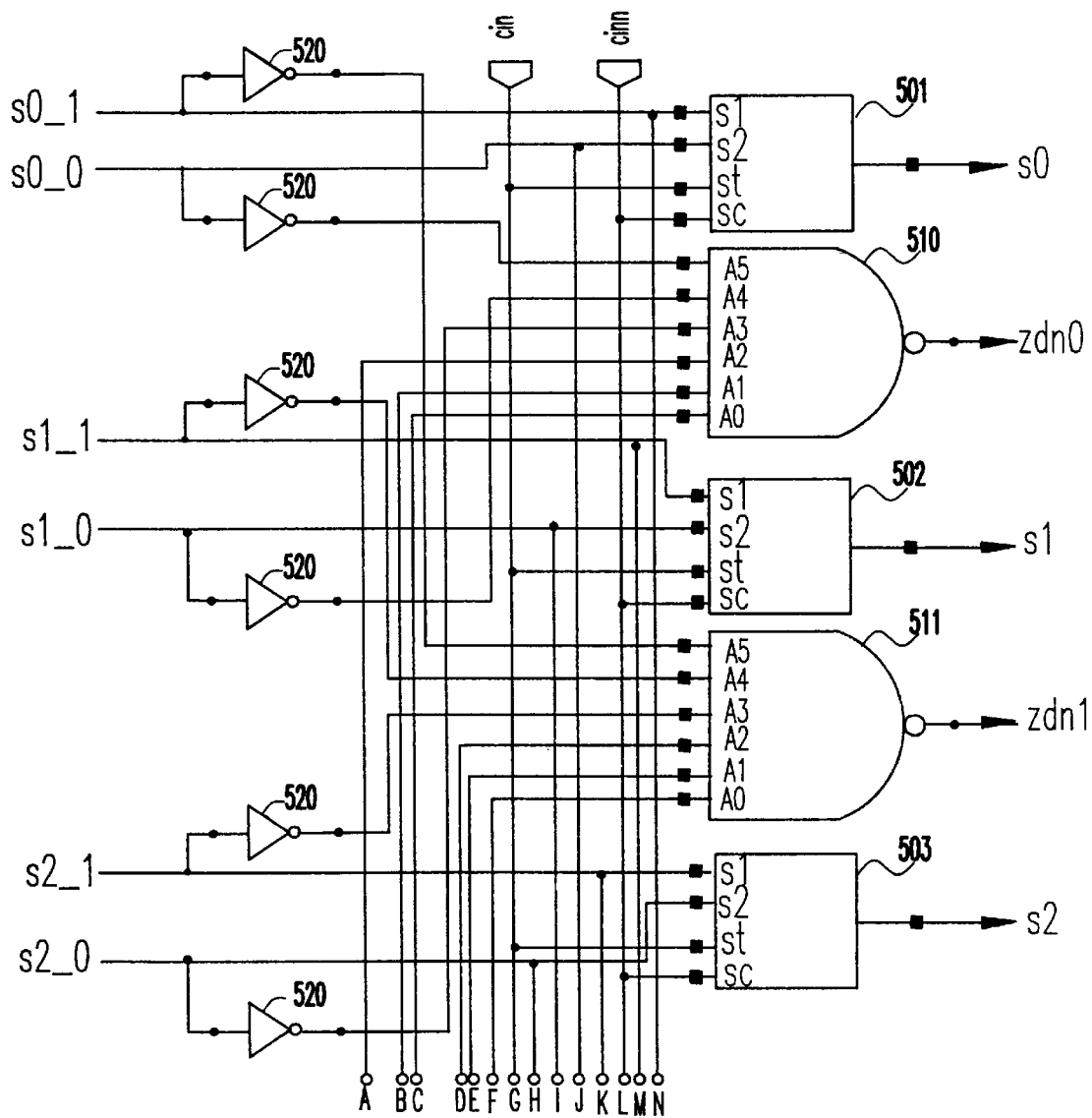
FIGS. 6, 6A, and 6B, taken together, show a block and logic diagram showing a sum circuit which generates the zero and one detection for a group of six bits in a carry select adder according to the invention.
Figure 6B:
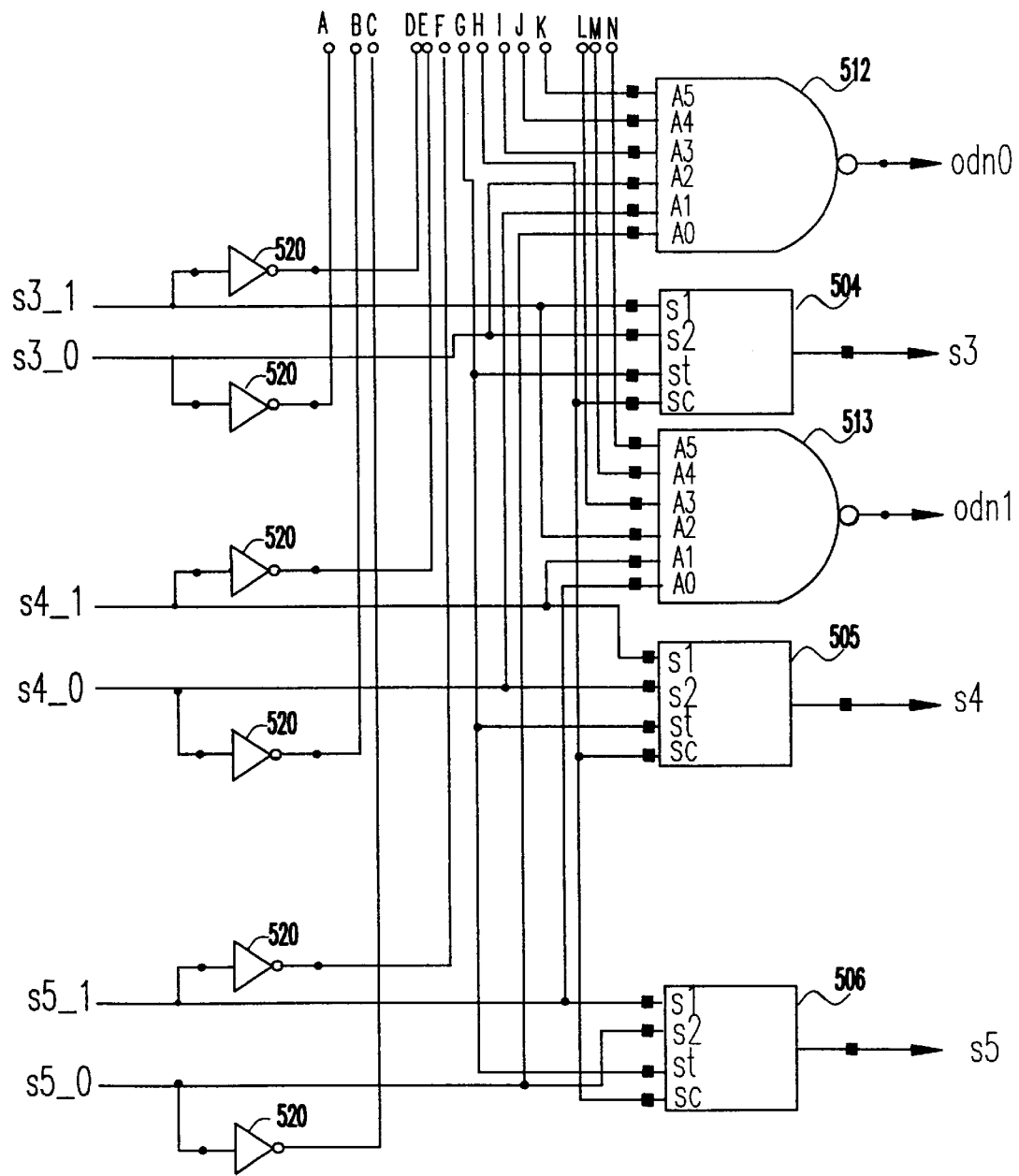

The operation of adder unit 120 is substantially similar to the combined operation of adders 101–102 and sum unit 105, illustrated in FIGS. 1A–D, except that adder unit 120 adds 6 bits instead of 4 bits. Therefore, adder unit 120 includes, in a preferred embodiment, three 2-bit adders (not illustrated) each producing outputs based on presumed carry-in signals of "0" and "1" and a 6-bit sum unit (not illustrated in 2). Such a 6-bit sum unit is illustrated in FIG. 6, which is discussed below.

Therefore, adder unit 120 produces the same outputs as adders 101–102 and sum unit 105 (i.e., two carry-out signals and their complements, two zero detection signals and two one detection signals based on different presumed carry-in signals, as well as the sum of the bits), except that adder unit 120 processes 6 bits.

Alternatively, adder unit 120 could include two 3-bit adders or a single 6-bit adder depending upon the application. Similarly, the adder units 101–102 could be replaced with a single 4-bit adder, if desired. In the preferred embodiment, 2-bit adders operating in parallel produces the optimum mixture of delay periods and hardware resource consumption. However, this could be varied depending upon the specific application.

Carry propagation unit 122 operates in the same manner as carry propagation unit 107 (illustrated in FIGS. 1A–D). Specifically, the carry-out based on a presumed carry-in of "0" (i.e., "c0e") from adder 120 and its complement "c0ne", as well as the carry-out based on a presumed carry-in of "1" (i.e., "c1e") from adder 120 and its complement "c1ne" are processed by inverters 126 to decouple the load of selector 122 from the selector 123, as discussed above. In FIG. 1B, the inverted carry-out signal "c0e" is identified as "c0ei", the inverted carry-out signal "c0ne" is identified as "c0nei", the inverted carry-out signal "c1e" is identified as "c1ei" and the inverted carry-out signal "c1ne" is identified as "c1nei." These inverted carry-out signals are input to carry propagation unit 122 as inputs "s1", "s2", "s3" and "s4", respectively.

The carry propagation unit 122 also receives the carry-out signal "co4" from carry selector unit 108 (FIGS. 1A–D) after being processed by inverters 125 (and its complement "co4n") and selects from the above inputs to output a carry-in signal "cin" (and its complement) to 6-bit adder 121.

The 6-bit adder 121 is identical to 6-bit adder 120 and includes the same components and outputs the same signals, except that 6-bit adder 121 processes bits 14:19 of the "a" and "b" values. Similarly, the carry selector 123 is identical to carry selector 108 and zero/one selector 124 is identical to zero/one selector 109. The difference between the same elements from FIGS. 1A–D that are illustrated in FIGS. 1A–B is that FIG. 1B relies upon the carry-out "co4" from FIGS. 1A–D as an actual carry-in and the portion of the circuit illustrated in FIGS. 2A–B process the upper 12 bits of values "a" and "b" Therefore, for brevity, a detailed discussion of the 6-bit adder 121, carry selector 123 and zero/one selector 124 will be omitted.

The NAND units 127–128 operate to combine the zero detection signal "zd1" from the first 8 bits with the zero detection signal "zdh" from the next 12 bits and to combine the one detection signal "od1" from the first 8 bits with the one detection signal "odh" from the next 12 bits.

A NAND unit will output a low signal only when all inputs are high. Therefore, NAND unit 127 will only output an "all zero" high signal (i.e., "zdn") when there is a high "all zero" signal "zd1" from the first 8 bits and there is a low "all zero" signal "zdh" from the next 12 bits. Similarly, NAND unit 128 will only output an "all one" signal (i.e., "odn") when there is an "all one" signal "od1" from the first 8 bits and there is an "all one" signal "odh" from the next 12 bits. These signals zdn and cdn are the complement of the zero and one detect (i.e., if all bits are zero, zdn will be low).

Therefore, the circuit illustrated in FIGS. 1 and 2 adds the first 20 bits of values "a" and "b", produces a sum (i.e., s<0:19>), a carry-out "co" (and its complement "con"), a zero detection signal "zdn" and a one detection signal "odn."

The zero/one detection selector 124 operates in parallel (i.e., simultaneously) with carry selector 123. Therefore, the production of the zero detection signal and one detection signal does not increase the delay when compared with a conventional carry select adder. The only delay associated with the zero and one detection signals is the operation of NAND units 127, 128. However, this delay is very small (i.e., on the order of 0.1 ns) because the NAND circuit have only two inputs and one output.

FIG. 3 illustrates the portion of a carry select adder for the upper 12 bits of a 32-bit carry select adder. Specifically, FIG. 3 illustrates 6-bit adders 201–202, a carry propagation unit 205, a carry selector 204, a zero/one detection unit 203 and inverters 206.

FIG. 3 is substantially identical to FIG. 2. Specifically, the 6-bit adders 201–202 are identical to 6-bit adders 120–121, the carry propagation unit 205 is identical to carry propagation unit 122, the carry selector 204 is identical to carry selector 123, zero/one detection unit 203 is identical to zero/one detection unit 124 and inverters 206 are identical to inverters 125. Therefore, detailed discussion of these elements will be omitted, for the sake of brevity.

The differences between FIG. 3 and FIG. 2 include the absence of inverters which feed the carry-in signal to carry propagation unit 205. The sum output of the upper 6 bits is the slowest path through the adder. To improve this delay, Cin is not buffered at the input of selector 205 but, instead, to selector 204, to balance the critical delay of the sum and Cout. Additionally, the NAND units 127, 128 are not included in FIG. 3, but that function is accounted for in the portion of the circuit illustrated in FIG. 4, discussed below.

Therefore, the circuit illustrated in FIG. 3 adds the upper 12 bits of values "a" and "b", produces a sum (i.e., s<20:31>), a carry-out "co" (and its complement "con"), a zero detection signal "zdn" and a one detection signal "odn." The complementary output is selected by the zero selector to be equivalent with the output zdn and odn output of the lower 20 bits.

The zero/one detection selector 203 operates in parallel (i.e., simultaneously) with carry selector 204. Therefore, the production of the zero detection signal and one detection signal does not increase the delay when compared with a conventional carry select adder.

FIG. 4 illustrates a summation of the portions of the circuit illustrated in FIGS. 1 and 2 and FIG. 3. Specifically, the addition of bits 0:19 of FIGS. 1 and 2 is performed by adder 301 and the addition of bits 20:31 of FIG. 3 is performed by adder 302. Inverter 303 generates the complement of the actual carry-in signal "cin" prior to its input to adder 301.

The NOR units 304–305 combine the zero detection and one detection signals. A NOR circuit outputs a low signal when either input is high and outputs a high signal only when both input signals are low.

The NOR unit 304 receives the zero detection signal "zdn1" from the lower 20 bits of unit 301 and the zero detection signal "zdnh" from the upper 12 bits of unit 302. The NOR unit 304 will only output an "all zero" signal "zd" if both zero detection signals (i.e., "zdn1" and "zdnh") indicates "all zero." Because odn1, zdn1, zdnh and odnh are complementary signals, if both zdn1 and zdnh are low, the output of NOR gate 304 will be high and indicate an "all zero" condition. Odn1 and odnh operate in a similar manner.

The NOR unit 305 similarly receives the one detection signal "odn1" from the lower 20 bits of unit 301 and the one detection signal "odnh" from the upper 12 bits of unit 302. The NOR unit 305 will only output an "all one" signal "od" if both one detection signals (i.e., "odn1" and "odnh") indicates "all one."

FIG. 5 illustrates the operation of a sum unit, such as sum units 105 and 106, shown in FIG. 1, in greater detail. Specifically, FIG. 5 illustrates selectors 401–404, NAND units 410–413 and inverters 420.

In operation, selector 401 receives the sum "s0_1" produced from the addition of the first bit of value "a" and value "b" by, for example, 2-bit adder 101 (FIG. 1) based on a presumed carry-in of "1" as input "s1". Selector 401 also receives the sum "s0_0" produced from the addition of the first bit of value "a" and value "b" based on a presumed carry-in of "0" as input "s2".

Selector 401 further receives the carry-in "cin" (and its complement "cinn") as input signals "st" (i.e., "sum true") and "sc" (i.e., "sum complement") respectively and, based on the carry-in, selects an output 's0' from the two inputs "s1" and "s2." The internal operation of such a selector is well known by those ordinarily skilled in the art and will not be described herein, for sake of brevity.

Selectors 402–404 are identical to selector 401 except that they perform a selection function on the next 3 bits (i.e. 1:3) which are added by adders 101—102 (FIG. 1). Thus, FIG. 1 illustrates, for example, that adders 101–102 simultaneously produce sum values based on a presumed carry-in of "0" and "1" and FIG. 5 illustrates how the sum unit 105 selects between these presumed values based on the actual carry-in signal.

The NAND unit 410 receives the sum "s0_0" produced from the addition of the first bit of value "a" and value "b" based on a presumed carry-in of "0", inverted by inverter 420, as input "A3"; the sum "s1_0" produced from the addition of the second bit of value "a" and value "b" based on a presumed carry-in of "0", inverted by inverter 420 as input "A2"; the sum "s2_0" produced from the addition of the third bit of value "a" and value "b" based on a presumed carry-in of "0", inverted by inverter 420 as input "A1"; and the sum "s3_0" produced from the addition of the fourth bit of value "a" and value "b" based on a presumed carry-in of "0", inverted by inverter 420 as input "A1."

In other words, NAND unit 410 receives an inverted signal from each bit which added with a presumed carry-in of "0." As mentioned above, a NAND unit will output a low signal (i.e. "zdn0" representing the complement of the "all zero" signal for the bits added with a presumed carry-in of "0") only when all inputs are high. Therefore, NAND unit 410 will only output a low signal when each of the inverted inputs A1–A3 is high. Note that a low signal (i.e., "1") input as, for example, signal "s0_0" will be inverted by inverter 420 to a high signal to generate zdn0, the complement of a 4-bit zero detect.

Thus, NAND unit 410 will only output a low signal "zdn0" when all of signals "s0_0", "s_0", "s2_0" and "s3_0" are a "0" signal.

The NAND unit 413 has identical connections as NAND unit 410, except that the connections to NAND unit 413 are not inverted by inverters 420. Therefore, NAND unit 413 will output a low signal "odn0" only when all of signals "s0_0", "s1_0", "s2_0" and "s3_0" are "1."

The NAND unit 411 receives the sum "s_1" produced from the addition of the first bit of value "a" and value "b" based on a presumed carry-in of "1", inverted by inverter 420, as input "A3"; the sum "s1_1" produced from the addition of the second bit of value "a" and value "b" based on a presumed carry-in of "1" inverted by inverter 420 as input "A2"; the sum "s2_1" produced from the addition of the third bit of value "a" and value "b" based on a presumed carry-in of "1", inverted by inverter 420 as input "A1"; and the sum "s3_1" produced from the addition of the fourth bit of value "a" and value "b" based on a presumed carry-in of "1", inverted by inverter 420 as input "A1."

In other words, NAND unit 411 receives an inverted signal from each bit which was added with a presumed carry-in of "1." As mentioned above, a NAND unit will output a low signal (i.e. "zdn1") only when all inputs are high. Therefore, NAND unit 411 will only output a low signal when each of the inputs A1–A3 is low. Thus, NAND unit 411 will only output a low signal "zdn1" when all of signals "s0_1", "s1_1", "s2_1" and "s3_1" are "0".

The NAND unit 412 has identical connections as NAND unit 411, except that the connections to NAND unit 412 are not inverted by inverters 420. Therefore, NAND unit 412 will output a low signal "odn1" only when all of signals "s0_1", "s1_1", "s2_1" and "s3_1" are "1."

The NAND units 410–413 output the complement of the zero and one detection signals as indicated by the "n" within the signal identifier. Therefore, if all the sums added with a presumed carry-in of "0" are low (i.e., all zeros), NAND unit 410 will output a low "zdn0" signal and NAND unit 413 will output a high "odn0" signal. Thus, the complement of the "all one" signal is high and the complement of the "all zero" signal is low when the inputs are "all zero."

In the same manner, NAND unit 410 outputs a high "zdn0" signal when the sums added with a presumed carry-in of "0" are "1", NAND unit 411 outputs a high "zdn1" signal when the sums added with a presumed carry-in of "1" are "1", NAND unit 412 outputs a low "odn1" signal when the sums added with a presumed carry-in of "1" are all "1", NAND unit 413 outputs a low "odn0" signal when the sums added with a presumed carry-in of "0" are "1."

Therefore, the sum unit illustrated in FIG. 5 selects the appropriate sum values based on the actual carry-in and simultaneously performs a zero detection function and a one detection function. Since the zero/one detection function is performed in parallel with the selection function, there is no additional delay associated with the zero/one detection function. Indeed, the zero/one detection results are available before the sum values because they are independent of the carry-in.

FIG. 6 illustrates a sum unit substantially similar to that shown in FIG. 5 which is incorporated within the 6-bit adders 120, 121, 201 and 202 shown in FIGS 2 and 3, as discussed above.

More specifically, FIGS. 6A–B illustrate selector units 501–506, AND units 510–513 and inverters 520.

Selectors 501–506 are identical to selectors 401–404 except that 6 selectors perform a selection function on 6 bits (i.e. 0:5) which are added by other non-illustrated adders within, for example, unit 120 (FIG. 2). As with the circuit shown in FIG. 5, the selectors 501–506 select between the alternative sums S1, S2 based on the actual carry-in and output sums s1–s5. For a detailed discussion of the operation of selectors 501–506, see the above discussion of selectors 401–404.

The AND units 510–513 perform a zero/one detection function for 6 bits. The AND circuits can be formed, for example, by two three way NAND circuits feeding a two way NOR circuit. Such a six way AND circuit generates the true zero/one detect and not the complement as in FIG. 5. Thus, the AND units 510–513 each have 6 inputs A0–A5, all of which must be high (i.e. "1") for the AND unit to output a "high" value indicating all ones or all zeros.

Therefore, if all the sums added with a presumed carry-in of "0" are low (i.e., all zeros), AND unit 510 will output a high "zd0" signal and AND unit 512 will output a low "od0" signal.

Similarly, if all the sums added with a presumed carry-in of "1" are low (i.e., all zeros), AND unit 511 will output a high "zd1" signal and AND unit 513 will output a low "od1" signal.

In the same manner, AND unit 510 outputs a low "zd0" signal when the sums added with a presumed carry-in of "0" are "1", AND unit 511 outputs a high "zd1" signal when the sums added with a presumed carry-in of "1" are "1", AND unit 512 outputs a low "od0" signal when the sums added with a presumed carry-in of "0" are "1" and AND unit 513 outputs a high "od1" signal when the sums added with a presumed carry-in of "1" are all "1."

The selector 124 receives the true zero and one detect signals as inputs and outs the true zd and od signals. Selector 109 receives the complement zdn and odn and outputs the true zd1 and od1 signals. Selector 203 receives the true zd1 and od1 input signals and outputs the complement zdn and odn signals. The output of selector 109 is reversed to the inputs zd0a and zd0na by the inverters 650. Both output polarities are generated and the appropriate signals are used for the different selectors 109, 124 and 203.

FIGS. 7A–B illustrates the selector 124 in detail. The function of selectors 109 and 203 are also easily understood from this description. The zero/one detection selector receives the zero detection signal zd0c regarding the sum values of an order of bits (i.e., bit positions 8:13) which were added with a presumed carry-in of "0" and the zero detect signal "zd1c" regarding the sum values of the order of bits which were added with a presumed carry-in of "1".

Similarly, the zero/one detection selector receives the zero detect signal "zd0d" regarding the sum values of a second order of bits (i.e., bit positions 14:19) which were added with a presumed carry-in of "0" and the complement of the zero detect signal "zd1d" regarding the sum values of the second order of bits which were added with a presumed carry-in of "1".

Similarly, the zero/one detection selector receives the one detection signal "od0c" regarding the sum values of the first order of bits (i.e., bit positions 8:13) which were added with a presumed carry-in of "0" and the one detection signal "od1c" regarding the sum values of the first order of bits which were added with a presumed carry-in of "1".

The zero/one detection selector also receives the one detection signal "od0d" regarding the sum values of the second order of bits (i.e., bit positions 14:19) which were added with a presumed carry-in of "0" and the one detect signal "od1d" regarding the sum values of the second order of bits which were added with a presumed carry-in of "1".

In addition, the zero/one detection selector receives the carry-in "cin" and its complement "cinn." The zd0a inputs of FIG. 6 are connected to the external signals zd0c and zd1c, while inputs ac0b and zd1b are connected to the external inputs zd0d and zd1d. The following discussion refers to the internal signal names.

The circuit illustrated in FIG. 6 includes transistors 601–616 and 620–636, cross-coupled units 640, 641 and inverters 650. Transistors 601–616 and 620–636 allow a signal to pass when the gate of the transistor is supplied with a high signal (i.e., "1"). As discussed above, a low signal (i.e., ground) is referred to as "0" and a high signal (i.e., Vdd) is referred to as "1" for ease of understanding.

In operation, transistor 601 allows a "0" signal (i.e., ground) to pass when signal "zd1a" is "0" (as inverted by inverter 650). To the contrary, transistor 602 allows the inverted "zd1b" to pass when the uninverted "zd1a" signal is "1".

Transistor 606 allows a "1" signal (i.e. Vdd) to pass when the "zd0b" signal is "1". To the contrary, transistor 608 allows the inverted "zd1b" signal to pass when the "zd0b" signal is "0" (as inverted by inverter 650). Transistor 607 allows the output from transistors 606 or 608 to pass when "zd0a" signal is "1". To the contrary, transistor 604 allows a "0" (i.e., ground) to pass when the "zd0a" signal is "0" (as inverted by inverter 650).

Transistor 603 allows the output of transistors 601 or 602 to pass when the carry-in signal is "1". To the contrary, transistor 605 allows the output of transistors 604 or 607 to pass when the carry-in signal is "0" (i.e., when "cinn" is high).

Therefore, transistors 601–608 operate together as follows. If the actual carry-in is "0", transistor 605 will allow a signal to pass. If both the "zd0a" and "zd0b" signals are "1" (i.e., indicating "all zero"), transistor 607 and 606 allows the VDD to pass. The low signal from transistors 606, 607 and 605 is supplied to the cross-coupled device 640 and is output as a high "zd" signal indicating that the "all zero" condition has been satisfied.

To the contrary, if the actual carry-in is again zero and "zd0b" is again "1", but "zd0a" is "0" (indicating a condition where not all the sums are zero), transistors 604 forces the input to the cross-coupled device 640 to a low state.

Transistors 609 to 616 are connected in a similar manner. However, transistors 609 to 616 output the complement of the zero detect function. The cross-coupled device 640 speeds up the output transition because cross-coupled pari 640 operates in a push-pull mode. The sources of devices 609, 610, 612, 614 and 616 are connected to the complement of the source of devices 601, 602, 604, 606 and 608, respectively.

Specifically, transistor 609 allows a high signal (i.e., Vdd) to pass when the "zd1a" signal is "0" (as inverted by inverter 650). To the contrary, transistor 610 allows the "zd1b" signal to pass when the "zd1a" signal is "1".

Transistor 614 allows a low signal to pass when "zd0b" is "1". To the contrary, transistor 616 allows the "zd1b" signal to pass when "zd0b" is "0" (as inverted by inverter 650). Transistor 615 allows the output of transistor 614 or 616 to pass when the "zd0a" signal is "1". To the contrary, transistor 612 allows a high signal to pass when the "zd0a" signal is "0" (as inverted by inverter 650).

Transistor 611 allows the output from transistor 609 or 610 to pass when the carry-in signal is "1". To the contrary, transistor 613 allows the output from transistor 612 or 615 to pass when the carry-in signal is "0" (i.e., the complement of the carry-in signal is "1").

Therefore, in operation, transistors 609–616 cause cross-coupled device 640 to output a high signal when the carry-in signal is "1" and signals "zd1a" and "zd1b" are both "0". Specifically, transistors 609 to 616 generate the complement of the zero detect function to provide the push-pull action in the cross-coupled pair 640. The cross-coupled p devices 640 also provide noise immunity and reduce power dissipation by bringing the side that has a high level all the way to the power supply.

Transistors 620–636 similarly act to check the sum results for an "all one" condition. Specifically, transistors 620–628 operate to check for the "all one" condition and generate the true signal, to the contrary, transistors 629, 363 operate to check for the "all one" condition and generate the complement of the one detect signal.

Transistor 620 allows the "od0b" signal to pass when the "od0a" signal is "1". To the contrary, transistor 621 allows a low signal (i.e., ground) to pass when the "od0a" signal is "0" (as inverted by inverter 650).

Transistor 628 allows the inverted "od1b" signal to pass when the "od0b" signal is "0". To the contrary, transistor 626 allows a high signal (i.e. Vdd) to pass when the "od0b" signal is "1". Transistor 627 allows the output of transistor 626 or 628 to pass when the "od1a" signal is "1". To the contrary, transistor 624 allows a low signal to pass when the "od1a" signal is "0" (as inverted by inverter 650).

Transistor 623 allows the output of transistor 620 or 621 when the carry-in signal is "0". To the contrary, transistor 625 allows the output of transistor 624 or 627 to pass when the carry-in signal is "1".

Therefore, in operation, transistors 620–628 cause cross-coupled device 641 to output a high signal when the carry-in signal is "1" and signals "od1a" and "od1b" are both "1". As for the zero detect selector, devices 620 to 628 generate the true one detect function and devices 629–636 generate the complement to provide the push-pull action on cross-coupled transistor pair 641.

In a similar manner as that discussed above, transistors 629–636 allow the complement of the "all one" signal to pass.

Specifically, transistor 629 allows the "od0b" signal to pass when the "od0a" signal is "1". To the contrary, transistor 630 allows a high signal to pass when the "od0a" signal is "0".

Transistor 636 allows the "od1b" signal to pass when the "od0b" signal is "0". To the contrary, transistor 634 allows a low signal to pass when the "od0b" signal is "1". Transistor 635 allows the output of transistor 636 or 634 to pass when the "od1a" signal is "1". To the contrary, transistor 632 allows a high signal to pass when the "od1a" signal is "0".

Transistor 631 allows the output of transistor 629 or 630 to pass to cross-coupled device 641 when the carry-in signal is "0". To the contrary, transistor 633 allows the output of transistor 632 or 635 to pass to cross-coupled device when the carry-in signal is "1".

Therefore, in operation, transistors 629–636 cause cross-coupled device 641 to output a high signal when the carry-in signal is "0" and signals "od0a" and "od0b" are both "1" in a similar manner as that described above with respect to devices 609–616.

A conventional zero detection circuit in, for example, a tree configuration, would require five logic delays after the sum bits are generated. The above-described allows for a much faster detection of overflow or underflow in an arithmetic unit.

Specifically, the sum units (i.e., FIG. 5) simultaneously sum the values and perform a zero/one detection operations. Indeed, the zero/one detection operation results will be available prior to the sum values. Therefore, the operation of the inventive sum units does not add any delay to the operation of a conventional carry-select adder. Further, the zero/one detection selector 109 operates in the same or less time than the carry selector 108 and similarly does not increase the delay associated with a conventional carry select adder.

The NAND units 127, 128 fractionally increase the delay as do NOR units 304, 305. However, this delay is only 0.2 nanoseconds for the most critical path. For many input conditions, the check signals are available before the sum bits and do not require any additional delay.

This implementation of the invention doubles the numbers of NAND gates in the first stage of the detections, but since the delay through this first stage is not in the critical path, smaller (and faster) devices may be used. The load on the output of the adder is also reduced, because the first level NAND gate is driven from some non-critical internal nodes.

Further, the above-described invention has speed advantages over conventional zero/one detection units which are generated in a tree configuration at the output of the adder. However, the size of the circuits in the first stage of the inventive zero/one detector is twice that of a similar conventional first stage. The present invention uses the adder circuitry to generate the sums and carry bits and, thus, uses much circuitry overall than conventional adders which perform the zero/one detection function entirely in parallel with the adder function.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A carry select adder comprising:
   at least one adder for outputting a first sum comprising addition of values based on a first presumed carry-in of zero and a second sum comprising addition of said values based on a second presumed carry-in of one; and
   at least one sum unit, connected to said at least one adder, for selecting an actual sum comprising one of said first sum and said second sum based on an actual carry-in, wherein said sum unit includes a detection unit which determines whether said actual sum comprises one of all zeros and all ones, said detection unit determining whether said actual sum comprises one of all zeros and all ones in parallel with the selection by said sum unit of said actual sum.

2. A carry select adder as in claim 1, wherein said sum unit selects said actual sum and said detection unit determines whether said actual sum comprises one or all zeros and all ones simultaneously as a result of said detection unit determining whether said actual sum comprises one of all zeros and all ones in parallel with the selection by said sum unit of said actual sum.

3. A carry select adder as in claim 1, wherein said detection unit comprises at least two units and each of said at least two units outputs:
   a first zero detection signal based on a first zero detection of whether said first sum comprises all zeros;
   a second zero detection signal based on a second zero detection of whether said second sum comprises all zeros;
   a first one detection signal based on a first one detection of whether said first sum comprises all ones; and
   a second one detection signal based on a second one detection of whether said second sum comprises all ones,
   said carry select adder further including a zero/one selector for producing:
      a first combined zero detection signal based on whether said first zero detection signal from each of said at least two units indicates all zero;
      a second combined zero detection signal based on whether said second zero detection signal from each of said at least two units indicates all zero;
      a first combined one detection signal based on whether said first one detection signal from each of said at least two units indicates all one; and
      a second combined one detection signal based on whether said second one detection signal from each of said at least two units indicates all one;
   said zero/one selector selecting between said first combined zero detection signal and said second combined zero detection signal based on said actual carry-in signal; and
   said zero/one selector selecting between said first combined one detection signal and said second combined one detection signal based on said actual carry-in signal.

4. A carry select adder as in claim 1, wherein said carry select adder comprises a 32-bit carry select adder, said at least one adder including a 20-bit adder and a first 12-bit adder, said 20-bit adder comprising an 8-bit adder and a second 12-bit adder.

5. A carry select adder as in claim 4, wherein said sum unit of said 20-bit adder outputs a 20-bit zero detection signal and a 20-bit one detection signal,
   said sum unit of said first 12-bit adder outputting a first 12-bit zero detection signal and a first 12-bit one detection signal,
   said carry select adder further including a first NOR unit for determining if said 20-bit zero detection signal and said first 12-bit zero detection signal each indicate all zeros, and
   said carry select adder further including a second NOR unit for determining if said 20-bit one detection signal and said first 12-bit one detection signal each indicate all ones.

6. A carry select adder as in claim 5, wherein said sum unit of said 8-bit adder outputs an 8-bit zero detection signal and a 8-bit one detection signal,
said sum unit of said second 12-bit adder outputting a second 12-bit zero detection signal and a second 12-bit one detection signal,
said carry select adder further including a third NOR unit for determining if said 8-bit zero detection signal and said second 12-bit zero detection signal each indicate all zeros, and
said carry select adder further including a forth NOR unit for determining if said 8-bit one detection signal and said second 12-bit one detection signal each indicate all ones.

7. A carry select adder as in claim 1, wherein said at least one sum unit comprises a 4-bit sum unit.

8. A carry select adder as in claim 1, wherein said at least one sum unit comprises a 6-bit sum unit.

9. A carry select adder as in claim 1, wherein said values and said actual sum each contain a plurality of bits, and wherein said detection unit determines, in parallel, whether the plurality of bits of said actual sum are one of all zeros and all ones.

10. A carry select adder comprising:
    means for adding including means for outputting a first sum comprising addition of values based on a first presumed carry-in of zero and means for outputting a second sum comprising addition of said values based on a second presumed carry-in of one; and
    means, connected to said adding means, for selecting an actual sum comprising one of said first sum and said second sum based on an actual carry-in,
    wherein said selecting means including a detecting means for determining whether said actual sum comprises one of all zeros and all ones, said detecting means determining whether said actual sum comprises one of all zeros and all ones in parallel with the selection by said selecting means of said actual sum.

11. A carry select adder as in claim 10, wherein said summing means selects said actual sum and said detecting means determines whether said actual sum comprises one of all zeros and all ones simultaneously as a result of said detecting means determining whether said actual sum comprises one of all zeros and all ones in parallel with the selection by said selecting means of said actual sum.

12. A carry select adder as in claim 10, wherein said summing means comprises at least two summing means and each of said at least two summing means outputs:
    a first zero detection signal based on a first zero detection of whether said first sum comprises all zeros;
    a second zero detection signal based on a second zero detection of whether said second sum comprises all zeros;
    a first one detection signal based on a first one detection of whether said first sum comprises all ones; and
    a second one detection signal based on a second one detection of whether said second sum comprises all ones,
    said carry select adder further including means for producing:
       a first combined zero detection signal based on whether said first zero detection signal from each of said at least two summing means indicates all zero;
       a second combined zero detection signal based on whether said second zero detection signal from each of said at least two summing means indicates all zero;
       a first combined one detection signal based on whether said first one detection signal from each of said at least two summing means indicates all one; and a second combined one detection signal based on whether said second one detection signal from each of said at least two summing means indicates all one;

said producing means selecting between said first combined zero detection signal and said second combined zero detection signal based on said actual carry-in signal; and said producing means selecting between said first combined one detection signal and said second combined one detection signal based on said actual carry-in signal.

13. A carry select adder as in claim 10, wherein said carry select adder comprises a 32-bit carry select adder, said means for adding including a 20-bit adder and a first 12-bit adder, said 20-bit adder comprising an 8-bit adder and a second 12-bit adder.

14. A carry select adder as in claim 13, wherein said summing means of said 20-bit adder outputs a 20-bit zero detection signal and a 20-bit one detection signal, said summing means of said first 12-bit adder outputting a first 12-bit zero detection signal and a first 12-bit one detection signal, said carry select adder further including a first selecting means for determining if said 20-bit zero detection signal and said first 12-bit zero detection signal each indicate all zeros, and said carry select adder further including a second selecting means for determining if said 20-bit one detection signal and said first 12-bit one detection signal each indicate all ones.

15. A carry select adder as in claim 14, wherein said summing means of said 8-bit adder outputs an 8-bit zero detection signal and a 8-bit one detection signal, said summing means of said second 12-bit adder outputting a second 12-bit zero detection signal and a second 12-bit one detection signal, said carry select adder further including a third selecting means for determining if said 8-bit zero detection signal and said second 12-bit zero detection signal each indicate all zeros, and said carry select adder further including a fourth selecting means for determining if said 8-bit one detection signal and said second 12-bit one detection signal each indicate all ones.

16. A carry select adder as in claim 10, wherein said summing means comprises a 4-bit summing means.

17. A carry select adder as in claim 10, wherein said summing means comprises a 6-bit summing means.

18. A carry select adder comprising:

means for adding including means for outputting a first sum comprising addition of values based on a first presumed carry-in of zero and a second sum comprising addition of said values based on a second presumed carry-in of one; and means, connected to said at least one adder, for selecting an actual sum comprising one of said first sum and said second sum based on an actual carry-in, wherein said selecting means includes a detecting means which determines whether said actual sum comprises one of all zeros and all ones, and wherein said summing means selects said actual sum in a first time period and said detecting means determines whether said actual sum comprises one of all zeros and all ones in a second time period, wherein said second time period is no greater than said first time period.

19. A carry select adder comprising:

at least one adder for outputting a first sum comprising addition of values based on a first presumed carry-in of zero and a second sum comprising addition of said values based on a second presumed carry-in of one; and at least one sum unit, connected to said at least one adder, for selecting an actual sum comprising one of said first sum and said second sum based on an actual carry-in, wherein said sum unit includes a detection unit which determines whether said actual sum comprises one of all zeros and all ones, and wherein said sum unit selects said actual sum in a first time period and said detection unit determines whether said actual sum comprises one of all zeros and all ones in a second time period, wherein said second time period is not greater than said first time period.

* * * * *